United States Patent
Robinson et al.

(10) Patent No.: US 6,202,197 B1
(45) Date of Patent: *Mar. 13, 2001

(54) PROGRAMMABLE DIGITAL SIGNAL PROCESSOR INTEGRATED CIRCUIT DEVICE AND METHOD FOR DESIGNING CUSTOM CIRCUITS FROM SAME

(75) Inventors: Jeffrey I. Robinson, New Fairfield; Keith Rouse, Oxford, both of CT (US)

(73) Assignee: Logic Devices Incorporated, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 07/474,742

(22) PCT Filed: Oct. 7, 1989

(86) PCT No.: PCT/US89/02986

§ 371 Date: Mar. 12, 1990

§ 102(e) Date: Mar. 12, 1990

(87) PCT Pub. No.: WO90/01214

PCT Pub. Date: Feb. 8, 1990

Related U.S. Application Data

(63) Continuation-in-part of application No. 07/217,616, filed on Jul. 11, 1998, now Pat. No. 5,068,823.

(51) Int. Cl.$^7$ ................................................. G06F 15/177
(52) U.S. Cl. ............................... 716/17; 716/16; 716/18; 716/4; 703/14; 703/15; 712/36
(58) Field of Search .................................. 395/500, 200, 395/800; 703/13, 14, 15, 16; 716/4, 16, 17, 18; 712/36, 43, 35

(56) References Cited

U.S. PATENT DOCUMENTS 4,377,849  3/1983  Finger et al. ......................... 364/491
4,439,839 * 3/1984  Kneib et al. ......................... 364/900

(List continued on next page.)

OTHER PUBLICATIONS

"Gabriel: A Design Environment for DSP" by Edward A. Lee et al. IEEE Transactions on Acoustics, Speech, & Signal Processing, vol. 37, No. 11, Nov. 1989, pp. 1751–1762.

(List continued on next page.)

*Primary Examiner*—William M. Treat
(74) *Attorney, Agent, or Firm*—Skjerven Morrill MacPherson LLP

(57) ABSTRACT

An apparatus architecture is provided which permits an easily programmed apparatus (10) to serve as an equivalent of an integrated circuit chip, and/or as a building block for a large system. The apparatus (10) is connected to a communications bus (40) which receives apparatus parameter, topological, and microinstruction information from a host processor and/or memory (EPROM). The apparatus includes numerous functional blocks (20), a core (30), and a parametric/microinstruction bus (35). The functional blocks include serial (62,66) and parallel ports (68), D/A (54) and A/D (52) converters, and programmable signal processors (300) which serve to process signal data and are connected in any desired manner through a switching matrix (160) located in the core. The topology of the switching matrix (160) is received via the communications bus (40). Parameters and microinstructions for the programmable signal processors (300) are sent via the communications bus (40), the core (30), and the parametric/microinstruction (35) bus. Topological and/or parametric data may be burned into the switch matrix and functional blocks as permanent programmed memory, or held in programmable nonvolatile or volatile memory associated with the core and functional blocks. Signal data is typically received and transmitted via the serial and/or parallel ports (62,66,68) and via the D/A and A/D (54,52) converters of the apparatus. Each apparatus can be made part of a larger wafer-scale system including several identical or architecturally similar apparatus by providing links between the apparatus.

36 Claims, 6 Drawing Sheets

U.S. PATENT DOCUMENTS

| | | | | |
|---|---|---|---|---|
| 4,467,409 | * | 8/1984 | Potash et al. | 364/700 |
| 4,631,686 | | 12/1986 | Ikawa | 364/490 |
| 4,641,238 | * | 2/1987 | Kneib | 364/200 |
| 4,703,436 | | 10/1987 | Varshney | 364/490 |
| 4,786,904 | | 11/1988 | Graham, III et al. | 340/825 |
| 4,791,602 | | 12/1988 | Resnick | 364/900 |
| 4,792,743 | | 12/1988 | Tsujino et al. | 320/15 |
| 4,845,633 | | 7/1989 | Furtek | 364/490 |
| 4,855,743 | | 8/1989 | Hester | 364/900 X |
| 4,864,381 | | 9/1989 | Seefeldt et al. | 357/45 |
| 4,870,302 | | 9/1989 | Freeman | 307/465 |
| 4,896,272 | | 1/1990 | Kurosawa | 364/491 |
| 4,967,340 | * | 10/1990 | Dawes | 364/700 |
| 4,985,830 | * | 1/1991 | Atac et al. | 364/200 |
| 5,068,823 | * | 11/1991 | Robinson | 395/500 |

OTHER PUBLICATIONS

Kevin L. Klocker, "The Motorola DSP56000 Digital Signal Processor," *IEEE Micro*, Dec. 1986, pp. 29–48.*

Engels et al., "Concept and Implementation of a Powerful Multiprocessor System for Digital Signal Processing," Internal Report KUL–ESAT–1989, Jan. 1989.*

Paul N. Hilfinger, "A High–Level Language and Silicon Compiler for Digital Signal Processing," *IEEE 1985 Custom Integrated Circuits Conference, Proceedings*, NY, May 1985, pp. 213–216.*

Denyer et al., "A Silicon Compiler for VLSI Signal Processors," *Digest of Technical Papers, ESS CIRC '82* (Brussels, Belgium), Sep. 1982, pp. 215–218.*

Huisken et al., "Design of DSP Systems on Silicon Using the Pyramid Library and Design Tools," *VLSI Signal Processing III* IEEE, NY, 1988, pp. 319–329.*

Lauwereins et al., "GRAPE: A Case Tool for Digital Signal Processing", IEEE ASSP Magazine, Apr. 1990, pp. 32–43.*

* cited by examiner

PROGRAMMABLE DIGITAL SIGNAL PROCESSOR INTEGRATED CIRCUIT DEVICE AND METHOD FOR DESIGNING CUSTOM CIRCUITS FROM SAME

This is a continuation-in-part of Ser. No. 07/217,616, now issued as U.S. Pat. No. 5,068,823, which is assigned to the assignee hereof.

BACKGROUND OF THE INVENTION

The present invention generally relates to programmable circuit devices. More particularly, the present invention relates to an architecture that permits the instantaneous realization of certain classes of systems in integrated circuit or discrete component form.

The task of making a commercial integrated circuit is expensive both in terms of time and money. Typically, a desired circuit is designed in a laboratory and modeled. Specifications for the design are then drawn and an integrated circuit design is made from the desired specifications. An integrated circuit is then fabricated according to known techniques. The cost from design to first fabrication is often in the tens of thousands of dollars, and time frame is usually several months. However, after fabrication, the chip must first be tested for errors in specification or design. Such errors, which are rather common, force the redesign of the chip and require another fabrication procedure. Before the entire process is finished, the cost to the designer will be in the many tens of thousands of dollars, if not hundreds of thousands, and the time from start to finish could very well be over a year.

In light of the above, it is clear that the task of creating an integrated circuit is fraught with many shortcomings. Besides the actual costs of designing a functioning chip, the large delays inherent in the process can impart a financial burden in lost revenues. Moreover, the rigid nature of the design process does not allow for interactive product development. Thus, desirable changes are not easily worked into the design, and because of time and dollar constraints may never be incorporated into the final product. Likewise, where an exact determination of the performance of a component is not obtainable in advance, current integrated circuit design techniques would require a user to breadboard his system and then subsequently size and cost reduce it with integrated circuits. Such a method is slow and expensive and is open to a multitude of problems in translating breadboards into chips.

Even after a chip has been perfected, it has to be produced in volume for production. The "productization" of a chip is the process of understanding the failure mechanisms that can limit yield and correcting for them. Increasing the yield reduces the cost of the chip and increases the security of supply. However, increasingly, application specific integrated circuits have been desired resulting in lower volumes of a greater number of different chips. The "productization" of a lower volume chip introduces another significant cost to the overall process. Moreover, with lower volumes, the designer will often face significant inventory problems, as lead times are usually on the order of a few months, but sales from month to month may be quite uneven.

Despite the many shortcomings of the standard manner of producing integrated circuits (ICs), the use of such ICs is virtually mandatory in the production of all electronic products as they could not be constructed with reasonable size and sold at a marketable price without them. On the other hand, the lead time necessary to produce an IC and the cost involved establish a significant entry barrier.

SUMMARY OF THE INVENTION

It is therefore an object of the invention to provide an architecture for the expeditious and cost-effective production of circuitry.

It is a further object of the invention to provide apparatus of an integrated circuit nature capable of being programmed to perform a multitude of useful functions at the command of a user.

It is yet a further object of the invention to provide a system using a plurality of identical apparatus, or a plurality of apparatus of similar architecture, the system being capable of being arranged to perform any of a multitude of desired complex functions at very high speed.

It is another object of the invention to provide a user-friendly system which can take desired configurations and requirements of a user and provide a parameterized, configured circuit capable of conducting desired functions at very high speed.

It is even another object of the invention to provide an apparatus architecture which permits a designer to design and modify an integrated circuit interactively and in real time.

In accord with the objects of the invention, an apparatus is provided which can either serve as the equivalent of an integrated circuit chip, and/or as a building block for a large system. The apparatus includes numerous functional blocks such as serial and parallel ports, D/A and A/D converters, and linear signal processors (LSPs). The LSPs can be programmed with microcode and/or parameters to perform any of numerous desired functions. If desired, instead of LSPS, the functional blocks can be set functional blocks such as biquad filters which are programmable with parameters only. The functional blocks are connected in any desired manner through a switching matrix located in the core. The core controls the switching matrix (topological data) as well as controlling the flow of parametric data, and where relevant the microcode data, to the functional blocks which sets the parameters (and microcode) of the functional blocks. Topological, parametric and microcode data are first received by the core via a communications bus from an external processor which generates the data, or from an external memory means which stores the data in memory for forwarding to the apparatus upon powering up of the same. The topological data are stored at the core, while the parametric and microcode data are forwarded to the functional blocks via a parametric bus. If desired, topological and/or parametric and microcode data may be burned into the switch matrix and functional blocks as permanent programmed memory, or held as programmable nonvolatile (EPROM) or volatile memory (RAM) associated with the core and functional blocks. Signal data, on the other hand, is typically received and transmitted via the serial and/or parallel ports and via the D/A and A/D converters (functional blocks) of the apparatus. Thus, the signal data is processed extremely quickly by having the parameterized (and programmed in the case of the LSP) functional blocks perform their operations on signal data and by forwarding the results to another functional block via the topologically arranged switching matrix.

Each provided apparatus can be made part of a larger system including several identical or architecturally similar apparatus by providing links between the cores of the apparatus. In this manner, each apparatus is a node of a larger system. To maintain processing speed and simplify interconnections, the links between the cores only carry signal and timing data.

Preferably, the provided apparatus and system are part of a user-friendly custom chip building system. Software is provided to permit a user to specify a desired arrangement of functional blocks and parameters for each block. In fact, preferably, a user could draw a desired filter frequency response, and the system could determine the required filter with its filter transfer function which could accomplish the desired output. The system could then automatically configure the apparatus by generating and providing the necessary topological data as well as the parametric (and microcode) data. The user would then be able to test the functioning of the apparatus in its desired environment. If changes were required either in the format of the chip apparatus (i.e. topological changes) or in the parameters or microcode of the functional blocks, these changes could be made in a real time interactive manner while signal data is flowing. When the desired results are obtained, the master program containing the topologic, parametric, and microcode can be stored. If changes in the matrix switching or in the parameters of the functional blocks are not necessary during the running of the program, the parameters and topology can be burned into the chip.

A better understanding of the invention, and additional advantages and objects of the invention will become apparent to those skilled in the art upon reference to the detailed description and the accompanying drawings.

DETAILED DESCRIPTION OF THE PREFERRED EMBODIMENTS

Figure 1:
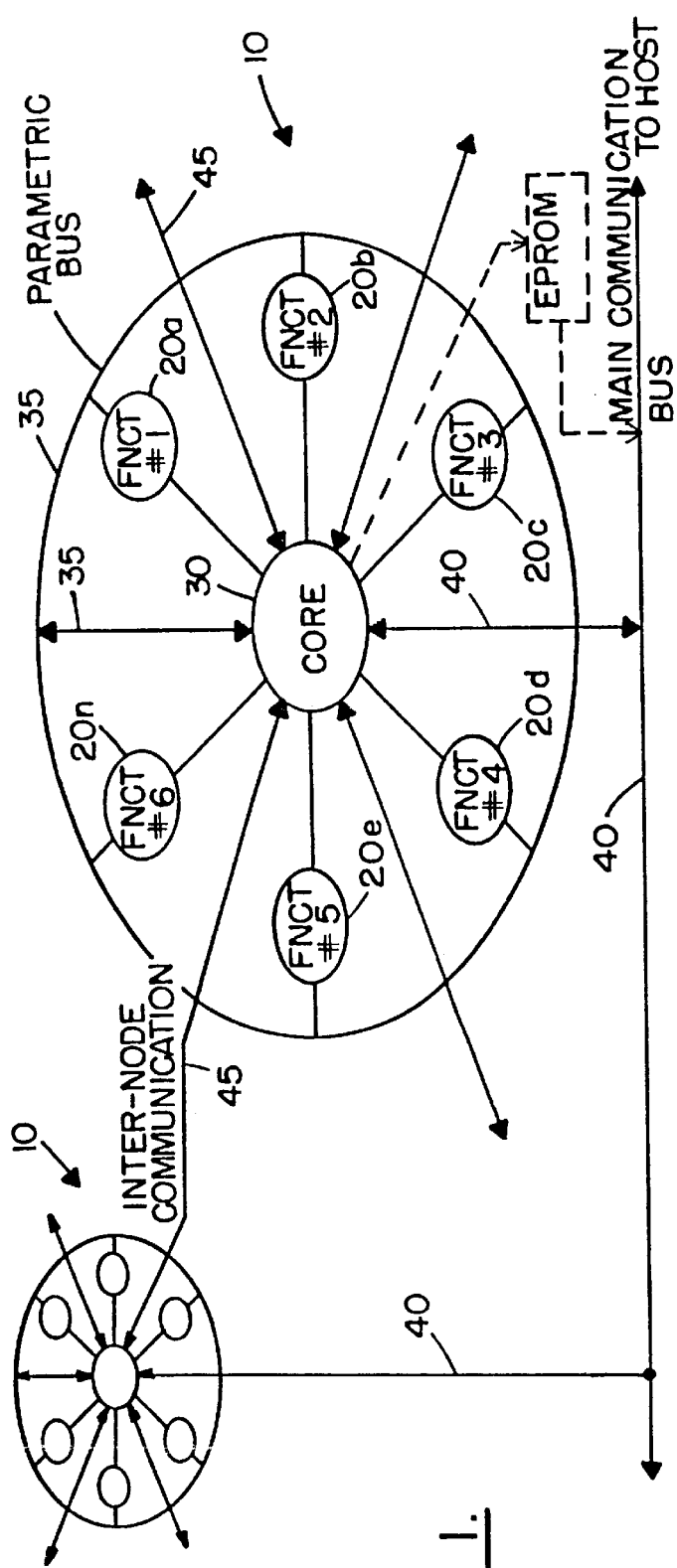
FIG. 1 is a block diagram of the programmable apparatus of the invention.

The basic concepts and architecture of the programmable apparatus 10 of the invention are seen in FIG. 1. The apparatus includes a plurality of functional blocks 20a, 20b, 20c, 20d . . . , a core 30, and a parameter bus 35. Preferably each apparatus 10 includes at lease one serial input port and one serial output port among the functional blocks 20, although, if desired, these ports may be located at and be considered part of the core 30. A simple standard apparatus (shown for example in FIGS. 4a–4d) capable of performing a plethora of functions might include as functional blocks one or more: serial input ports; serial output ports; bi-directional parallel ports; A/D converters; D/A converters; and LSPs or functionally specific blocks such as biquadratic filter processors. Where the LSPs of FIG. 5 are used as functional blocks, functions such as performed by biquadratic filter processors are recognized in the LSPs. Of course, many other functions could be encompassed by the provided functional blocks or LSPs including, without limitation FIR processors, modulators, summing junctions, rectifiers, limiters, microprocessors and amplifiers. Typically, each functional block is arranged in a standard integrated circuit format as is well known in the art, and in the case of the LSPS, the functional blocks prior to programming with microcode are identical. Also, as will be described in more detail below, each functional block 20 is arranged to interface with core 30 both via a parameter bus 35 for receiving parametric information and via serial busses of a core switching matrix (seen in FIG. 2a). Where the functional blocks 20 are LSPs, microcode is transmitted over the parameter bus 35.

All communications to and from the functional blocks 20 with the exception of the port blocks is via core 30. Core 30, which is the physical heart of the apparatus 10 is also responsible for functions other than controlling data flow into and out of the functional blocks. These functions include: interfacing to a main communications bus 40, interpreting all data into and out of the apparatus 20, including signal, parametric, microcode, and topological data; providing timing signals to control data flow (where necessary); and providing data routing via a non-blocking matrix switch (seen in FIG. 2a). preferably, the core 30 also provides a test function as will be described hereinafter.

As will be appreciated from FIG. 1, one manner of communicating with apparatus 10 is via the main communications bus 40. In one embodiment, where the functional blocks are programmable with parameters only and not with microcode, main communications bus 40 is a parallel bus of eight bit width for data and four bit width for core address. In arranging apparatus 10 upon start up, parametric and topological information (respectively for the functional blocks and the switching matrix of the core) is sent to the core 30 of apparatus 10 from an external processor or memory (not shown) via communications bus 40 as will be detailed below. The topological information is stored in resident memory of the core (which can be associated RAM, EPROM, or the physical burning of paths) and is used to arrange the switching matrix (which includes serial busses) of the core so that the functional blocks 20 will be properly connected to perform the desired function. Parametric data, on the other hand, is sent from core 30 via parametric bus 35, which is preferably a parallel bus of twenty-four bit width, to the functional blocks 20 to which it belongs. Internally, only one functional block may be loaded with parametric data at a time. Functional blocks 20 store the parametric data in resident memory which can either be volatile or non-volatile memory.

It will be appreciated that different types of data (e.g. parametric, signal, and topological data) are coded differently to permit the core 30 to interpret the same. Of course, in order for core 30 to "interpret" the received data and send it to its proper destination, core 30 preferably includes a decoder (generally also termed a "processor"). In accord with the embodiment of FIG. 2a, decoder 110 receives four address bits from communications bus 40, thereby allowing sixteen different address locations to be addressed. If the four bit address code indicates address zero, one, or two, the data contained on the eight bit section of communications bus 40 is considered part of a twenty-four bit word which is stored in respective eight-bit registers of parametric receiving circuit 120. If the four bit address code indicates address three, the eight bit data word contained on bus 40 is a destination register for the twenty-four bit word stored in the parametric receiving circuit. Thus, three bits of the eight bit word destination might designate which of up to the five coefficients of a biquad filter is to receive the twenty-four bit (parametric) word, while three additional bits might be used to designate which of up to eight biquad filters is being addressed. An additional bit or two might be used to indicate that the data in the parametric receiving circuit 120 is not parametric data but is in fact signal data which is to be sent to a filter input of a first or second independent system which are created by having asynchronous channels (as described more fully hereinafter).

If the four address bits decoded by address decoder 110 indicate addresses four, five or six, the eight bit word on the bus 40 is sent to topology definition registers 130 which are used to configure the matrix switch. Thus, with address four, output configurations are set with three bits of the eight bit word used to define the biquad output for channel A, and three additional bits used to define the biquad output for channel B. The remaining two bits select from one of four modes: channel A is output from the digital/analog converter; channel B is output from the digital/analog converter; channel A and B alternate; and all eight biquad filter outputs are scanned. Where the address is five, the input configurations are set, with two sets of two bits used to defined each of four different possibilities for each of the two channels: input from the A/D converter; input from a first serial port; input from a second serial port; and input from a parallel port. Fifth and sixth bits are used to partition the order of the channels, while seventh and eight bits define input and output port data lengths (e.g. twenty-four or sixteen bits). Where the address is six, the outputs are defined, with three bits used to define the output for the first channel registers, three bits used to define the output for the second channel registers, and two bits used to select one of up to four biquad filters for the serial out port.

Finally, where the address of the four bit address received by address decoder 110 is seven through twelve, a byte of data from any of six output registers 140 is chosen to be placed onto bus 40. The bytes of data in registers 140 are obtained from the biquad processor functional blocks in a serial manner and are formed into eight bit bytes in the registers 140.

Figure 2A:
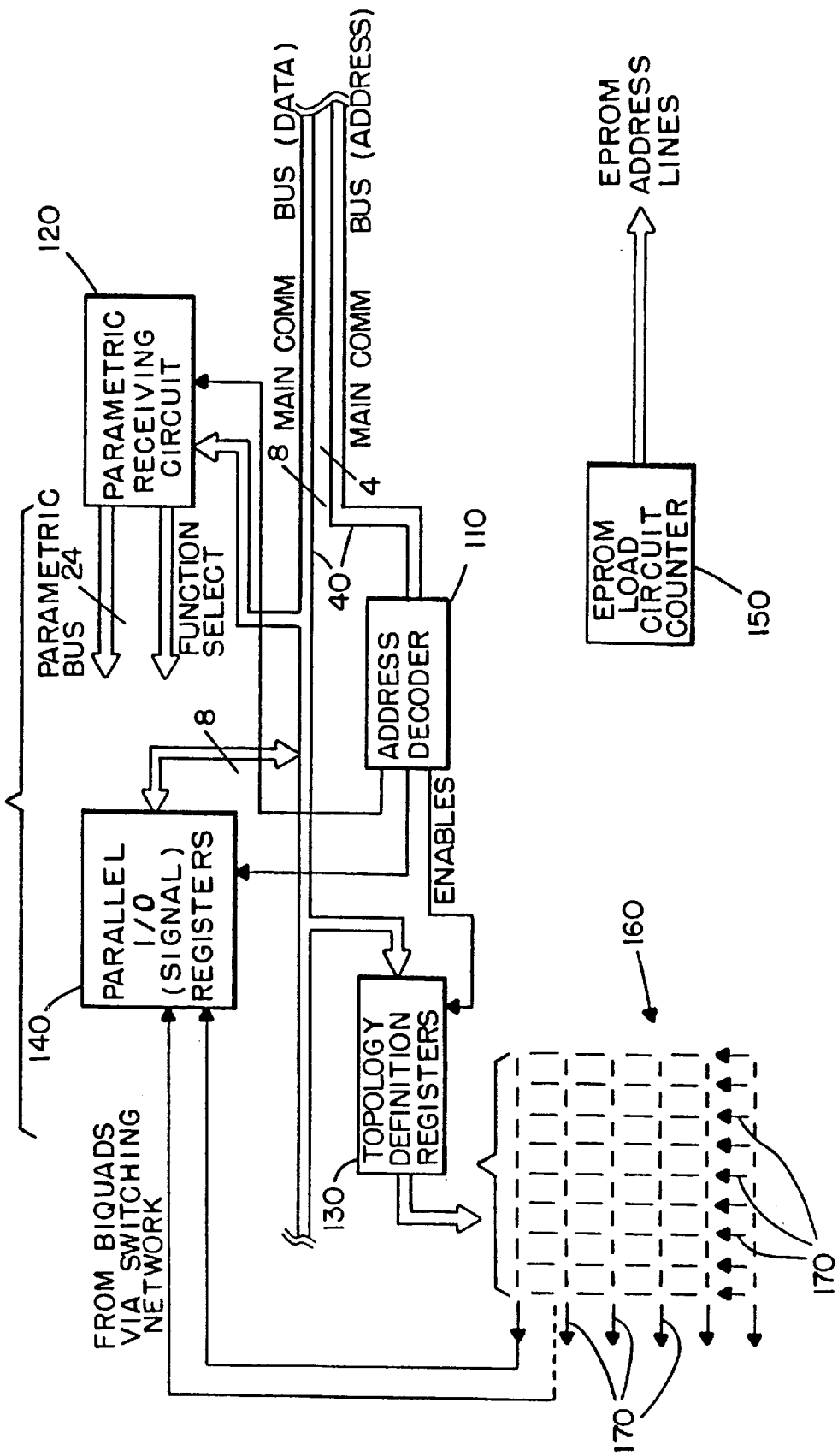
FIGS. 2a and 2b are block diagrams of two embodiments of the core of the apparatus of the invention.

As seen in FIG. 2a, core 30 also preferably includes an EPROM load circuit 150 which is essentially a counter. The counter prompts locations in an EPROM which may be associated with the apparatus 10 or may be associated with a host, and the EPROM then places address and associated data on the communications bus 40 to configure the apparatus 10 with the desired topology and parametric information.

While parametric and topological data are received via main communications bus 40, signal data is typically received via the serial and/or parallel ports, or the A/D converter (functional blocks 20) of the apparatus 10 and then forwarded to the core 30 via the busses 170 of the switching matrix 160 of the core. Once reaching the switching matrix 160 of the core, the signal data is routed to another functional block 20 in accord with the topology of the core. If the signal processing of the functional blocks does not complete the processing of the signal data, the partially processed signal data is then sent to one or more other functional blocks via the switching matrix of the core either in a serial or parallel manner. That is, while all signal data is transferred serially (i.e. bit by bit) by the busses 170 of switching matrix 160, the functional blocks may be chained together via the switching matrix of core 30 in a serial manner, or if desired several functional blocks may receive the output of another functional block in parallel to accomplish the desired signal processing. Regardless, when the processing is completed, the signal data may be sent out of the apparatus 10 via an output port functional block (serial or parallel), via the D/A converter, or via parallel output registers 140 of core 30 and communications bus 40.

As aforestated, signal data may enter and exit apparatus 10 via the main communications bus 40 (address bits set to value three, with sixth and seventh data bits set to indicate the sending of signal data to independent system). If communications bus 40 is connected to a computer, such signal data communications is critical for computer interaction. Thus, signal data to be communicated to the apparatus 10 is stored by the host computer until it desires to send the data to apparatus 10. Then, by providing a proper address code and the data, the data may be sent to a desired location. Signal data to be received by the host from the apparatus 10 is stored in parallel output registers 140. When the host requests that signal data by sending the proper code (address codes seven through twelve), the apparatus 10 sends the data via bus 40. Because the main communications bus 10 is controlled by the host, communications via bus 40 tends to be slower than the serial communication of signal data internal apparatus 10. The separation of the manner and means of handling signal data from the manner and means of handling parametric and topological data provides broad flexibility and increased apparatus speed.

Figure 3:
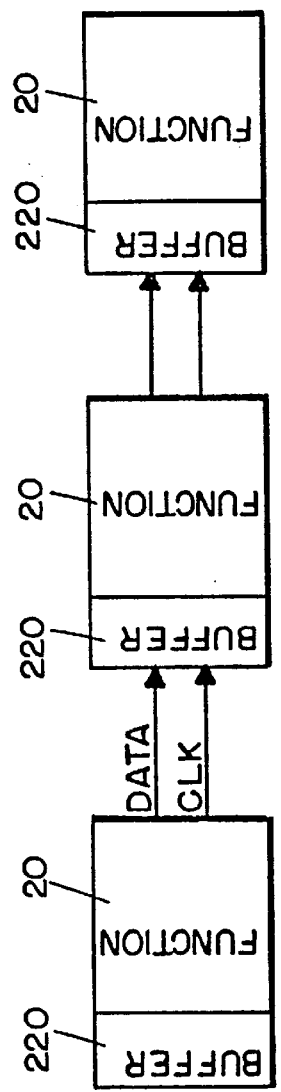
FIG. 3 is a block diagram of an alternative embodiment of the functional blocks of FIG. 1.

As aforementioned, core 30 may provide timing signals for controlling the flow data through apparatus 10. As each of the functional blocks 20 requires timing signals for proper operation, if a single clock is used to control data flow, the clock must be set to permit the slowest of the functional blocks to complete its most time-consuming task. The resulting timing signal would include a period for signal processing, i.e. computation, the end of which would comprise a period for signal transfer via the switching matrix of the core to the next desired location. While the timing generator (clock) for the apparatus 10 need not be local to the apparatus itself, the maximum number of independent asynchronous channels that can be handled by the apparatus is equal to the number of timing generators associated with the apparatus.

Where the functional blocks 20 are relatively straightforward, the afore-described processing scheme permits extremely high speed. However, in the preferred embodiment where the functional blocks 20 are LSPs, a different timing scheme is preferred. Thus, turning to FIG. 3, an arrangement is shown where each functional block 20 is provided with a buffer 220. As will be discussed hereinbelow with reference to FIG. 5, the buffer 220 may constitute one or more locations in a variable RAM (V-RAM). With the provided buffer, the apparatus 10 need not have any formal signal flow and each functional block, upon completion of its computation, can send out its data to another LSP via the matrix switch. The receiving LSP, upon receipt of data in its buffer, raises an appropriate flag to inform the controller (sequencer) of the LSP of the receipt of data. The provided buffered arrangement permits particular functional blocks to process data over several cycles without outputting serial results. Thus, if properly arranged, other signal processing may be accomplished without incurring time penalties due to the relatively slow processing nature of or particularly time-consuming function performed by one of the functional blocks. Additional information regarding this preferred timing scheme may be understood with reference to the description accompanying FIGS. 2b and 5.

Returning to FIG. 1, it is seen that core 30 of apparatus 10 further interfaces with inter-node busses 45, which are preferably simply timing and signal data busses. Thus, each provided apparatus 10 can be made part of a larger circuit or system including several identical or architecturally similar apparatus by providing bus links 45 between the cores or serial input and output ports of the apparatus. Because timing signals may be transferred via bus links 45, the manner of accomplishing the afore-mentioned possibility of a non-local clock, and/or multiple clocking signals and hence multiple asynchronous channels becomes evident. With a multiple of clocks, not only may two or more different signals pass through the switch matrix of the core at one time (provided the topology is such that the signals are non-conflicting), but previously conflicting signals may now be made non-conflicting by proper timing control. It is also of note, that the topology of the switching matrix 160 of the core may be switched during the functioning of a single program by properly controlling the timing of the flow of topological data into apparatus 10. Thus, depending upon the program controlling apparatus 10, the apparatus can change topology at preset time intervals, or can dynamically change topology based on the results of signal data received by the host from apparatus 10 or based on other information.

With ability to configure a plurality of apparatus 10 into a system, and in accord with another aspect of the invention, wafer scale integration is provided with redundant apparatus 10. In the larger system, the cores 30 of the apparatus 10 are preferably provided with a testing function. Instructions which can test the functioning of the various functional blocks as well as self-diagnostic instructions are kept in memory associated with the core 30. Upon powering-up of the apparatus 10, the core 30 tests the functional blocks (or LSPs) 20. If any block 20 is not working, the core will effectively map that block out of memory and use another block within the apparatus to perform the desired function. Where each functional block is an identical LSP, redundancy is most often available. Regardless, if desired, the core can inform the host of the extent of its functioning (i.e. how many and which functional blocks are inoperative). If the entire apparatus is non-functional or is not capable of performing the functions of which it is required in the wafer scale system, the host will determine the same, and a redundant apparatus 10 may be configured and used in its stead.

Figures 4A, 4B:
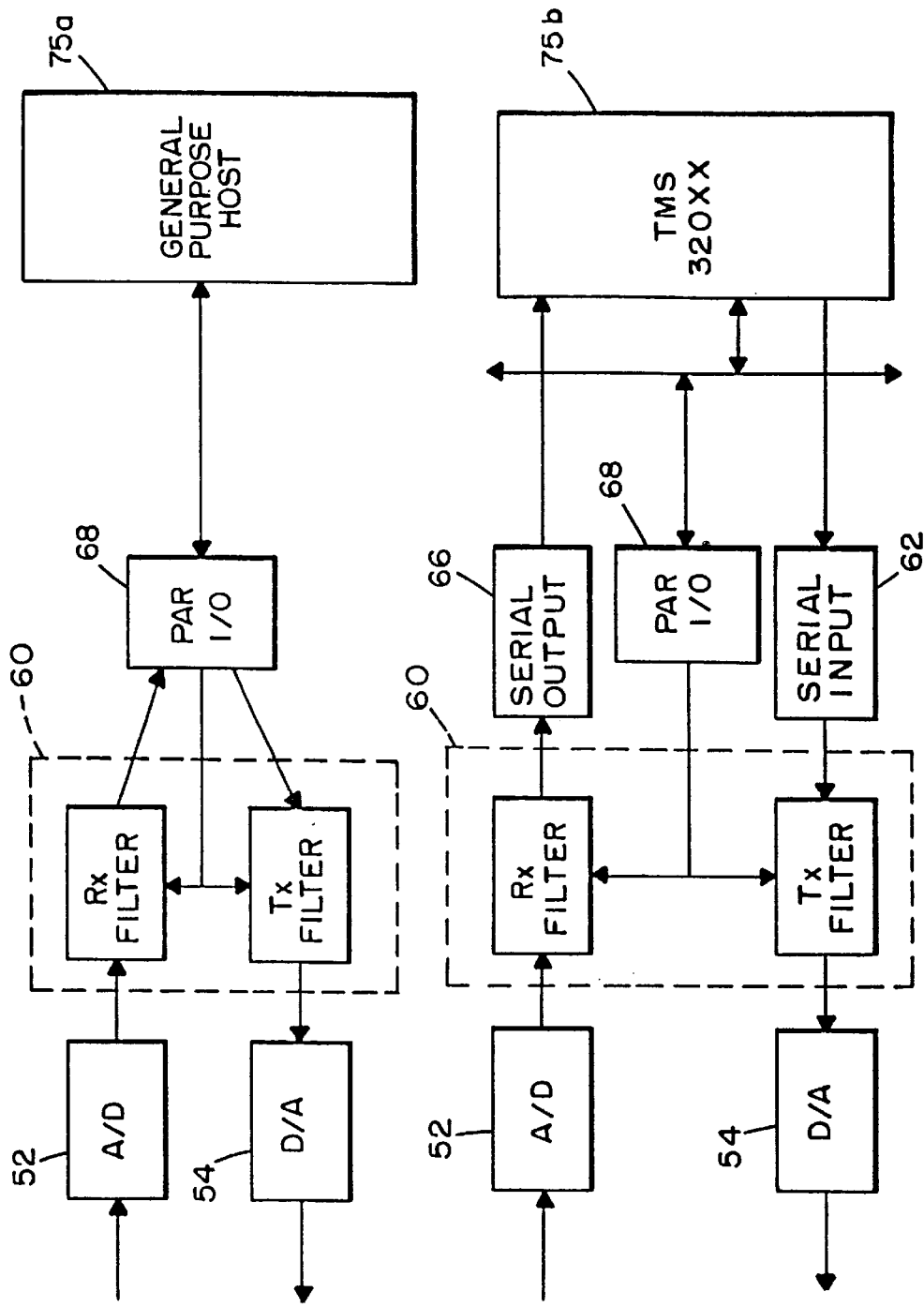
FIGS. 4a–4d are block diagrams of different arrangements of a single apparatus of the invention, with FIG. 4a representing an analog to digital interface, FIG. 4b representing an analog to digital interface for a particular DSP, FIG. 4c representing a filter of arbitrary order, and FIG. 4d representing a servo control system.

Turning to FIGS. 4a–4d, and example of a single apparatus 10 configured in four different ways is shown. Apparatus 10 of FIGS. 4a–4d includes twelve bit A/D and D/A converters 52 and 54 respectively, eight twenty-four bit biquadratic filter processors 60, two serial input ports 62 (the second port not shown) a serial output port 66, and an eight bit bi-directional parallel port 68. FIG. 4a depicts a classical analog/digital interface with signal data being received by A/D converter 52, filtered by a subset of filter processors 60, and sent via bi-directional parallel port 68 to a general purpose host computer 75a. Signal data leaving computer 75a is sent via bi-directional port 68 to the transmit filter subset of filter processors 60 and out of apparatus 10 via D/A converter 54.

FIG. 4b also depicts an analog/digital interface. However, the interface of FIG. 4b is for a Texas Instruments TMS 320XX range of digital signal processors. Signal data being received is processed by the A/D converter 52, filtered by the receiving filter subset of filter processors 60 and sent to serial output port 66 for forwarding to the processor 75b. Signal data leaving processor 75b is sent via serial input port 62 to the transmit filter subset of filter processors 60. The filter digital signal data is then D/A converted by converter 54. Parallel port 68 is used to access the parametric bus of the apparatus 10 for dynamic assignment of parameters for biquad filters 60.

Figure 4C:
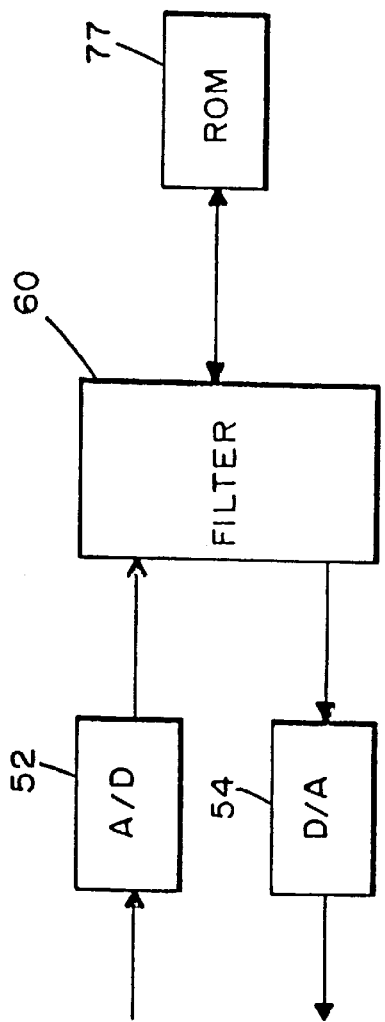
Figure 5:
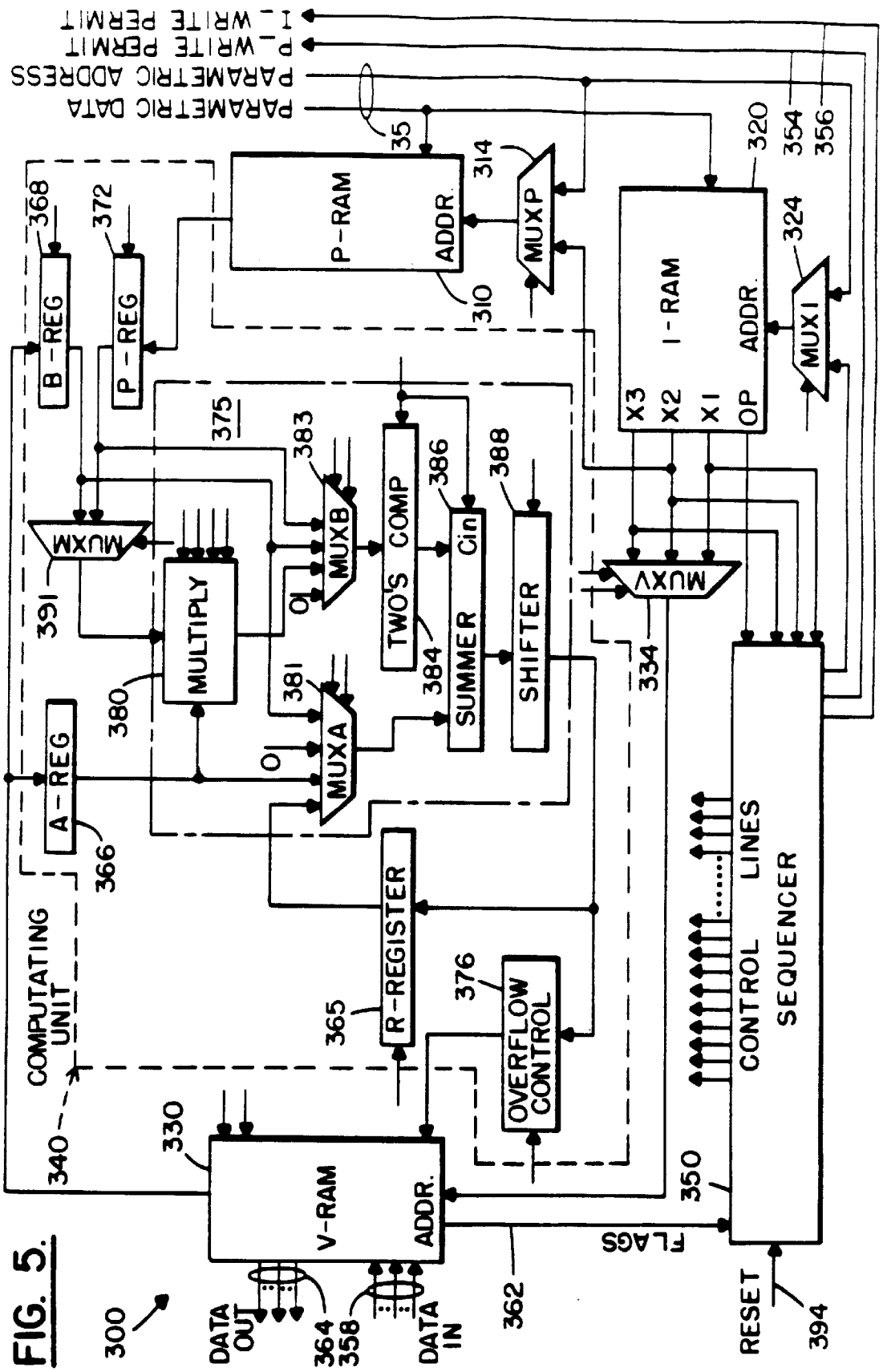
FIG. 5 is a block diagram of the preferred LSP of the invention which in a preferred embodiment of the invention comprises the functional blocks other than the A/D, D/A and serial input and output ports.

FIG. 4c depicts a filter of arbitrary order. Signal data is converted by A/D converter 52 into digital signal data, and filtered by filter processors 60. The parameters of the filter are stored in ROM 77 which received the parameters via the parameter bus of the apparatus 10 and which arranged filters 60 accordingly. The filter of FIG. 4c, reconverts the now-filtered signal into analog signal data at D/A converter 54.

Figure 4D:
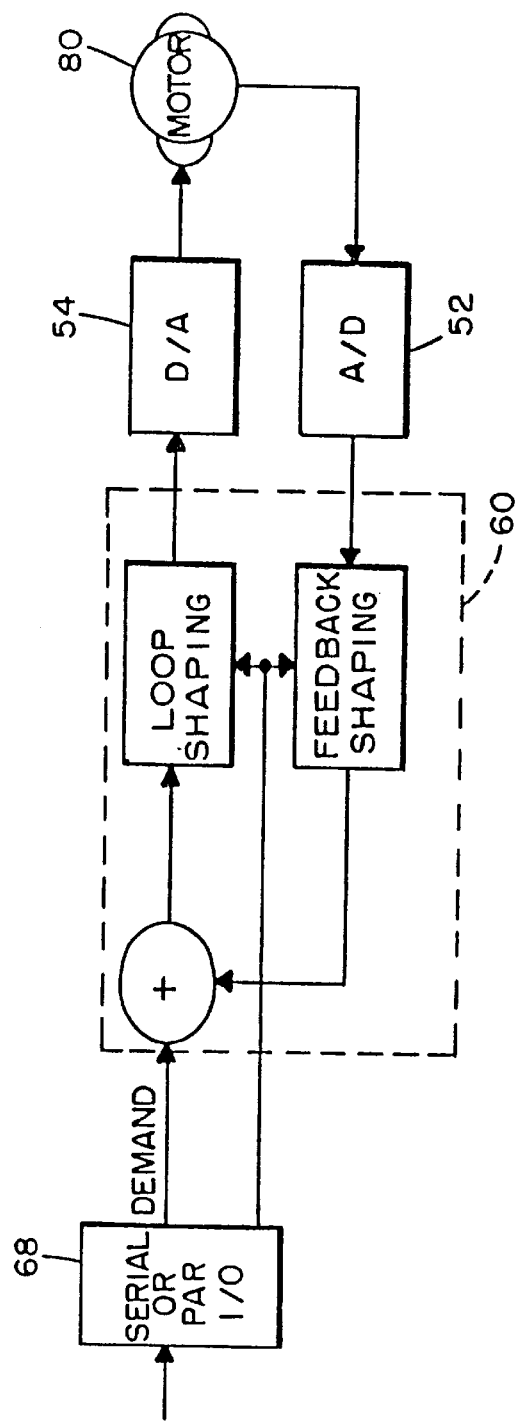

FIG. 4d depicts a servo control system. The positional demand enters the system via a serial input port 62 or the parallel port 68 and is applied to summing junction which is embodied in a biquad filter 60. The output of the summing junction is passed via a subset of the biquad processors 60 to a D/A converter 54. The biquad processors are programmed to form the forward compensation and gain of the overall loop. The D/A converter output is used, via a power amplifier (not shown) to drive the motor 80. The output of a positional sensor (not shown) on the servo (not shown) is digitized by A/D converter 52 and fed to another subset of biquad processors 60 for any feedback shaping that might be required. The output of the feedback is returned to the input summing junction to complete the loop.

It will be appreciated that depending upon the functional blocks incorporated into apparatus 10, and the ability to network a plurality of the apparatus 10 into a larger system, a plethora of applications can be accomplished. For example, typical applications in instrumentation might include: spectrum analysis; function generation; pattern matching seismic processing; transient analysis; digital filtering; and phase locked loops. In voice/speech, typical applications would include: voice mail; speech vocoding; speech recognition; speaker verification; speech enhancement; and speech synthesis. Similarly, many different control, military, automotive, telecommunications, medical, industrial, consumer, graphics/imaging, and general purpose DSP applications would be readily apparent. Indeed, wherever integrated circuit technology is useful, the apparatus of the invention could be utilized. In fact, by providing the functional blocks with the ability to be programmed as well as parameterized, great flexibility is built into the system so that identical chips can be programmed in many different ways to accommodate many different applications.

Turning to FIG. 5, a detailed block diagram is seen of an LSP 300 which acts as the basic functional block of the preferred embodiment of the invention. The LSP 300 is essentially comprised of three RAMS (P-RAM 310, I-RAM 320, V-RAM 330) with associated multiplexers (MuxP 314, MuxI 324 and MuxV 334), a computing unit 340 having a plurality of registers, multiplexers, and an arithmetic core, and a sequencer 350.

The P-RAM 310 contains parametric data. The contents of P-RAM 310 can be modified (i.e. written to) only via the parametric data bus 35 (see FIG. 1) which in FIG. 5 is shown as including parametric data and parametric address busses. The P-RAM 310 and the I-RAM 320 preferably share address space. Thus, whether or not the P-RAM is written to is a function of the address received over the parametric address bus, as well as the control of the P-RAM multiplexer MUXP 314 which is controlled by sequencer 350. As will be described in more detail below, parametric data may be written to P-RAM 310 when the sequencer 350 raises a flag P-WRITE_PERMIT-FLAG 354, which essentially occurs when the LSP is not reading from the P-RAM. Because the LSP is not continually reading from the P-RAM 310, it will be appreciated that real time modification of parameters is permitted while the LSP is processing signal data.

The I-RAM 320 contains microcode instructions. As shown in FIG. 5, the contents of I-RAM 320 can be modified only via the parametric data bus 35, and then only when the sequencer 350 raises a flag I-WRITE_PERMIT_FLAG 356. The I-WRITE_PERMIT_FLAG 356 is raised during machine cycles where access to the I-RAM is allowed as will be detailed below.

The V-RAM 330 of the LSP contains variable data. The contents of V-RAM 330 can be modified (i.e. written into) by the computing unit 340 as well as by the arrival of new input data via data in lines 358. The new input data arrive in specifically designated locations (which broadly amount to the buffer 220 of FIG. 3) in the V-RAM and are monitored such that flags 362 are raised upon the receipt of data. Other specifically designated locations are used as output ports so that the computing unit 340 can write to the output port locations and cause data to be transmitted from the LSP over output lines 364. R-Register 365, is preferably an extension of the V-RAM 330 (i.e. they share address space) and is used to hold partially processed information; i.e. accumulated values.

The computing unit 340 includes several registers (A-Register 366; B-Register 368; P-Register 372; R-Register 365), a computing core 375 and an overflow control 376. The A-Register 366 and B-Register 368 are used to store operands obtained from V-RAM 330, while P-REG 372 is used to store operands obtained from P-RAM 320. As previously mentioned, R-Register 365 is used to store partially processed information received from the computing core 375. The computing core 375 preferably includes a multiplier 380, two multiplexers MuxA 381 and MuxB 383, an inverter 384, an adder 386, and a shifter 388. As indicated, multiplier 380 receives its multiplicand and multiplier from registers A-Register 366 and either B-Register 368 or P-Register 372 via multiplexer MuxM 391. The operands in the various registers may also be forwarded directly to MuxA 381 or MuxB 383, which are also provided with a zero input. Inverter 384 and adder 386 are shown to work in tandem when a two's complement value is desired, as a two's complement is obtained by inverting the bits and then adding the value one thereto. Any result obtained by adder 376 may be shifted by shifter 388 to effect a multiplication or division by two (or by $2^n$ where n is an integer). The output of shifter 388 is either to R-Register 365 or to V-RAM 330 via overflow control 376. Overflow control 376 functions either in the saturate or the roll-over mode. In the saturate mode, where the output of shifter 388 exceeds the largest permissable value, the largest permissable value is stored in V-RAM 330. In the roll-over mode, the output of shifter 388 is converted into the modulus of the largest permissable value.

As will be appreciated by those skilled in the art, the computing core 375 is capable of conducting operations such as multiplication, addition, subtraction, negation, copying, shifting, etc. under direction of the sequencer 350. In fact a list of operations that can be performed by the computing core are as follows (by way of example, rather than by way of limitation):

| mnemonic | function | op-code |
|---|---|---|
| ADD_VV | add variable to variable | 000000 |
| ADD_VP | add variable to parameter | 000001 |
| COPY_PV | copy a parameter to a new location | 000010 |
| COPY_VV | copy a variable to a new location | 000011 |
| CLR | set a variable to zero | 000100 |
| DIODE_N | force the value to zero if positive | 000101 |

-continued

| mnemonic | function | op-code |
|---|---|---|
| DIODE_P | force the value to zero if negative | 000110 |
| INVERT | twos complement of variable | 000111 |
| MAC_PV | multiply variable by param & add accum | 001000 |
| MAC PV_S | mult var by param; add accum and shift | 001001 |
| MAC_VV | multiply var by var and add accum | 001010 |
| MODE | set saturation or overflow mode | 001011 |
| MULT_VP | multiply variable by parameter | 001100 |
| MULT VP_S | multiply variable by parameter and shift | 001101 |
| MULT_VV | multiply variable by variable | 001110 |
| PHASEDET | multiply by sign of a variable | 001111 |
| SHIFT_L1 | left shift a variable | 010000 |
| SHIFT_R1 | right shift a variable | 010001 |
| SUB_VP | subtract variable from parameter | 010010 |
| SUB_VV | subtract variable from variable | 010011 |
| WAIT | input flag, decimation, oversample | 010100 |

The op-code referenced by the above chart is the six bit op-code used as part of the twenty-four bit words stored in the I-RAM 320. The instructions contained in the I-RAM preferably also include three six-bit address codes (x1, x2 and x3). The first two address codes (x1 and x2) address locations in the V-RAM or P-RAM which are loaded into one or more of the A-Reg 366, B-Reg 368, and P-Reg 372. The third address code (x3) addresses a destination address in the V-RAM 330 (including R-Register 365).

The op-code as well as the six-bit address codes are read by the sequencer 350 which accesses the I-RAM 320 through MuxI 324. The sequencer is preferably a micro-coded ROM, although it could take the form of a programmable logic array, or a series of logic gates. In response to the op-code, the sequencer 350 accesses from its storage a plurality of instructions which relate to the op-code. For example, in performing the operation MULT_VP x1, x2, x3, in a first cycle, the sequencer would apply x1 via the V-MUX 334 to the V-RAM address bus, apply x2 via the P-Mux 314 to the P-RAM address bus, apply a read/write control to both the V-RAM 330 and P-RAM 310, and turn the shifting and two's complement controls off (control lines being indicated by arrows leaving the sequencer and arrows into the various registers, multiplexers, multiplier, adder, etc.) In a second cycle, the sequencer would apply a clock edge to the A-Reg 366 and P-Reg 372 to receive the contents of address x1 from the V-RAM and the contents of address x2 from the P-RAM, and to have the multiplier 380 start multiplying. The multiplication would then continue through cycles three through seven for a total of six cycles, and on cycle seven, x3 would be applied to the V-RAM 330 via MuxV 334. On the eighth cycle, the result of the multiplication would be sent via MuxB 383, and non-functioning inverter 384, adder 386 and shifter 388 to overflow control 376. Depending upon the product and the mode in which overflow control 376 is set, overflow control 376 would provide the "answer" to location x3 in V-RAM; i.e. the product would be written into the V-RAM.

An LSP functional block outputs a result to its associated core 30 by writing to a specifically designated location in its V-RAM 330. Once the specified location of the V-RAM receives the data, it is immediately transmitted in a serial form along with a clock signal out over the data out lines 364. The data is clocked into the receiving LSP (via the core switching matrix) by the transmitted clock thereby avoiding timing skews that might otherwise be present in the transmission path. Once the data is received (via data in lines 358), it is immediately placed in a desired location in the V-RAM.

The LSP 300 of the invention and the sequencer 350 of the LSP preferably function in several states. A first state is the Reset state which is established when the reset input 394 into the sequencer 350 is flagged. In the Reset state the sequencer 350 does not control the flow of data, and data is loaded into the P-RAM and I-RAM from the host. The data loaded into the P-RAM and I-RAM is considered "parameter" data, although the I-RAM data are actually microinstructions comprised of op-codes and addresses (x1,x2,x3), while the P-RAM data are actual parameters which might be used, e.g. to set the parameters of a biquad filter.

A second state of the LSP 300 is the active state where instructions are being executed by the computing unit 340. In the active state, the sequencer 350 controls the functioning of the LSP 300 by interpreting the op-code into instructions, and by using control lines to control the various elements of the computing unit, as well as the RAMs. In the active state the I-RAM cannot be updated, although the P-RAM can be during cycles which do not utilize it.

A third functioning state of the LSP is the Wait state which is initiated by the Wait op-code instruction in the I-RAM. In the Wait state the sequencer instructions are halted until new data has arrived into V-RAM 330 via data in lines 358 and can be operated upon. Once this data has been received (as indicated by flags 362), the execution of the sequencer instructions, including the receipt by the sequencer of the op-code from I-RAM 320, can resume. During the Wait state the sequencer 350 is controlling, but will allow data into the P-RAM and I-RAM.

Additional states of the LSP 300 are over-sampling and decimation states. In over-sampling, the sequencer instructions are executed a number of times for each data input as specified by the instruction parameter therefor. In decimation, inputs are skipped before executing the program. For example, in decimation by three, the sequencer would stay in the Wait state until the three data samples are received by the V-RAM. After processing the data received by V-RAM, the sequencer would return to the Wait state until three more data samples are received by the V-RAM. Yet another state for LSP 300 is for the sequencer 350 to remain in the wait state until a flag controlled by an outside processor is set. The setting of the flag would cause the program execution to start, with the flag being cleared once execution begins. the output of parallel registers 140b are the data in lines 358 of the V-RAMs of the LSPS. Similarly, in order for the host to read data from the V-RAM, the data out lines 364 are provided as inputs into the parallel registers 140b. It should be recognized however, that the data out and data in lines of the V-RAM of FIG. 5 is intended also to include connections to matrix switch 160b. In other words, where signal data are being passed from one LSP to another, the signal data are sent via matrix switch 160b. Where the host is communicating with the LSP directly, the signal data are sent via the parallel registers 140b.

As previously mentioned, topological, parameteric and microcode instruction data are passed via multiplexer 139b to intelligent buffer 199b before being forwarded to their appropriate locations. The multiplexer 139b of FIG. 2b (which is not shown in FIG. 2a, but is implied) is preferably provided in order to permit a host interface (i.e. the interface from the product in which apparatus 10 is being used) to be disconnected and an interface 137b from a development system (which is initially used to configure apparatus 10) to be connected. In this manner, parametric, microcode instruction, and topological data can be modified during the operation of the apparatus in the user's product so as to facilitate rapid product development. Once the product system has been finalized, the EPROM or other memory which configures the apparatus 10 upon power up may be programmed with the desired configuration.

Figure 2B:
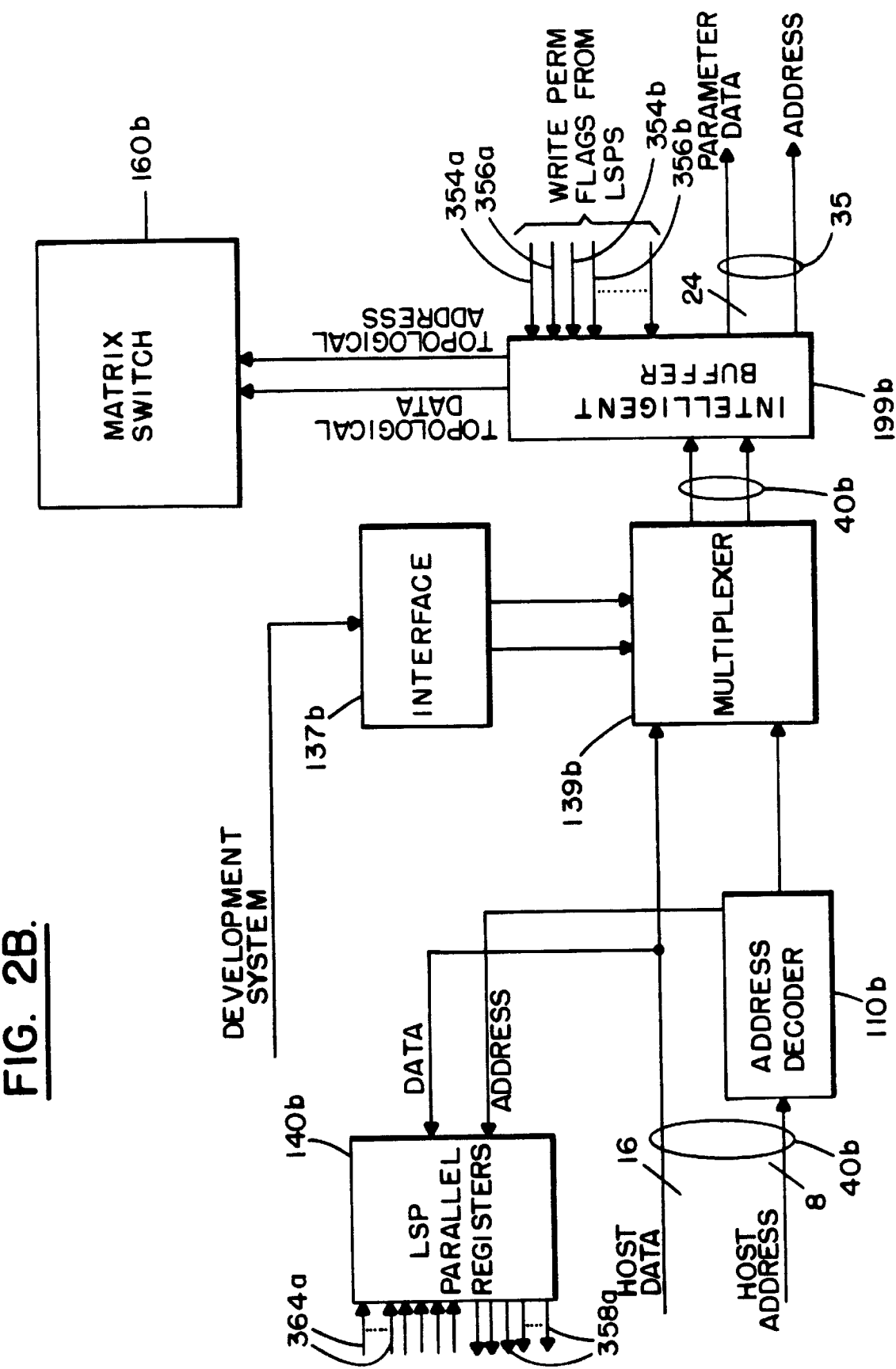

As suggested above, the provided apparatus is preferably programmed by a user-friendly custom chip development system which is resident on a computer. Software which will run on the computer is provided to permit a user to specify a desired arrangement of functional blocks and parameters for each block. In fact, preferably, a user could draw a desired filter frequency response with a mouse, light pen, or similar input The LSP of FIG. 5 is preferably used within an apparatus having a core as shown in FIG. 2b. A host (not shown) transfers data over the main communications bus 40b which includes a sixteen bit data bus and an eight bit address bus. The address on the address bus is decoded by address decoder 110b which determines whether the data is topological data destined for configuring the matrix switch 160b, parametric or microcode instruction data destined for an LSP via parameter bus 35, or signal data destined for the V-RAM of an LSP via parallel registers 140b. Address decoder 110b also decodes the destination (e.g. which LSP) for the parametric, microcode, or signal data.

Where topological data are being transferred by the host, the data and associated address pass through multiplexer 139b and buffer 199b and are forwarded to the matrix switch 160b. The topology of matrix switch 160b is controlled thereby. Where parametric data or microcode instructions are being transferred by the host, the host is required to write two sixteen bit data words which consist of twenty-four bits of data and an eight bit address. The eight bit address controls the location within the I-RAM or P-RAM of the LSP dictated by address decoder 110b to which the data is to be written. The two sixteen bit data words are passed by multiplexer 139b to the intelligent buffer 199b which rearranges the two sixteen bit data words into the twenty-four bit parameter or microcontrol instruction and the eight bit address. When the write permit flags for the I-RAM or P-RAM are raised (flags 354 and 356) for the LSP of interest, the intelligent buffer 199b sends the twenty-four bit parameter or microcode instruction along with the eight bit address over the parametric bus 35.

Where the host desires to send signal data to an LSP, the signal data are forwarded to the parallel registers 140b for forwarding to the appropriate LSP. As indicated in FIG. 2b, device, and the computer could determine the required filter parameters which could accomplish the desired frequency response. The computer could then automatically configure the apparatus or plurality of linked apparatus by generating and providing (via the main communications bus) the necessary topological and parametric data (including microinstructions for I-RAMs) required to accomplish the desired result. The user would then be able to test the functioning of the apparatus in its desired environment. If changes were required either in the format of the chip apparatus (i.e. topological changes), in the parameters of the functional blocks or LSP (i.e. parametric changes, including microinstruction changes) or in the clocking, the necessary reprogramming would be easily accomplished while signal data was flowing such that the apparatus could be retested in "real time". When the desired results are obtained, the master program containing the topological, parametric, and microcode data can be stored in the host processor or an associated non-volatile memory so that the apparatus or system can be reloaded at any time. Of course, where static chips are to be manufactured (i.e. changes in the matrix switching or functional block parameters are not necessary during the running of a program), the parameters and topology can be burned into the chip for permanent memory.

In another method of the invention for designing and producing custom circuits, once the desired topology, parameters, and where necessary, microcode of the apparatus are obtained, the topology, parameters, instructions, etc. may be used as a blueprint for the production of chips according to standard silicon device production procedures. In certain circumstances such chips may be produced in great quantities less expensively than by using the chip of the instant invention as the starting silicon, because fewer LSPs, D/A and A/D converters, and data ports may be necessary than are provided on the standard chip of the invention. In other words, by using the structure developed on the apparatus of the invention, an integrated circuit device with no wasted silicon can be easily derived therefrom.

There has been described and illustrated herein a programmable apparatus which can be utilized as the equivalent of a custom designed integrated circuit device, and methods of utilizing the same. While particular embodiments of the invention have been described, it is not intended that the invention be limited exactly thereto, as it is intended that the invention be as broad in scope as the art will permit. Thus, while a particular addressing scheme was described for distinguishing between topological, parametric, and signal data, and particular addressing was described for setting the switch matrix topology and the parameters of the functional blocks, it will be appreciated that other techniques (e.g. coding, timing, or hardware) could be utilized to accomplish the same. For example, different busses could be used for different types of data. With such a configuration, the core would not necessarily have to decode all incoming data to determine its destination as parametric data could be sent directly to the parametric bus. Likewise, microcode information need not use the parametric bus, but could be sent over its own bus. Further, it should be appreciated that terminology such as "processing", and "operation" are intended to be understood in their broadest sense. Thus, all functional blocks perform an "operation" on data, whether it be a timing operation (e.g. buffering, or data flow), a mathematical operation (e.g. summing, multiplying, etc.), a filtering operation (e.g. low or high pass filtering, etc.), an interface function (e.g. A/D or D/A conversion; serial/parallel port; etc.) or other operation. Similarly, in performing an operation, the functional blocks and the core of the programmable apparatus "process" data. Further yet, while in one embodiment, an apparatus having particular functional blocks was disclosed, and in another embodiment the functional blocks were more generic LSPs which were programmable via the parameter bus, it will be appreciated that the provided functions or combination of functions of the various functional blocks can vary widely in a given apparatus. Likewise, while the main communications bus was described as interfacing with a host, those skilled in the art will appreciate that, depending on the circumstances, the host could be (without limitation) a computer, a microprocessor, or and EPROM. When the chip has already been designed and is functioning in the user's sytem, the host is provided by the user's system. However, in the designing process and where chip topology is required to be adaptive, the host is often a computer or a microprocessor. Where the apparatus topology is static and the topology and functional block parameters are finalized, an EPROM can serve to properly initialize the switch matrix and functional blocks upon powering up of the apparatus. Of course, in such circumstances, the EPROM could also be eliminated by metallizing the apparatus or otherwise effectively hard coding the topology and functional block parameters. Therefore, it will be apparent to those skilled in the art that other changes and modifications may be made to the invention as described in the specification without departing from the spirit and scope of the invention as so claimed.

What is claimed is:

1. A programmable apparatus for interfacing with a communications bus, said apparatus comprising:

a) a plurality of programmable signal processor means having means for receiving and storing parameters and microinstructions, and means for executing microinstructions, each said programmable signal processor means for performing an operation according to said microinstructions and said parameters on signal data received by said programmable signal processor means;

b) a core means comprising interface means for interfacing with said communications bus, decoder means for distinguishing between at least topological and parametric data received by said core means over said communications bus, and matrix switching means for interconnecting at least two of said plurality of programmable signal processor means in a desired manner in response to said topological data received over said communications bus;

c) a plurality of data bus means for connecting said plurality of programmable signal processor means to said matrix switching means; and d) at least one third bus means coupled to said core means and to said means for receiving and storing, for transmitting said parametric data and said microinstructions to said means for receiving and storing of at least a plurality of said programmable signal processor means.

2. A programmable apparatus according to claim 1, further comprising:

e) a first non-volatile programmable memory means, for storing topological, parametric and microinstruction data for said programmable apparatus.

3. A programmable apparatus according to claim 1, wherein:

said plurality of programmable signal processors include means for providing control outputs indicative of the state of said the respective programmable signal processors; and said interface means of said core means constitutes an intelligent buffer means for receiving at least said parametric data and addresses associated with said parametric data, and for receiving said control outputs indicative of the states of the respective programmable signal processors, said intelligent buffer means forwarding said parametric data via said third bus means to appropriate means for receiving and storing parameters of said programmable signal processors when permitted by said control outputs.

4. A programmable apparatus according to claim 3, further comprising:

an analog to digital converter, a digital to analog converter, a serial input port, and serial output port, each of which is coupled to said core means.

5. A programmable apparatus according to claim 4, wherein:

said processing means of said core means distinguishes between at least topological data, parametric data, and signal data.

6. A programmable apparatus according to claim 5, wherein:

said core means further comprises a plurality of parallel register means for interfacing said communications bus and said plurality of programmable signal processors, and for permitting signal data to be written directly to or read directly from said programmable signal processors via said communications bus and an associated said parallel register means.

7. A programmable system, comprising:

a) a communications bus;

b) a plurality of programmable apparatus which interface with said communications bus, each said apparatus comprising, 1) a plurality of programmable signal processor means having means for receiving and storing parameters and microinstructions, and means for executing microinstructions, each said programmable signal processor means for performing an operation according to said microinstructions and said parameters on signal data received by said programmable signal processor means;

2) a core means comprising interface means for interfacing with said communications bus, processing means for distinguishing between at least topological and parametric data received by said core means over said communications bus, and matrix switching means for interconnecting at least two of said plurality of programmable signal processor means in a desired manner in response to said topological data received over said communications bus; and 3) a plurality of data bus means for connecting said plurality of programmable signal processor means to said matrix switching means; and 4) at least one third bus means coupled to said core means and to said means for receiving and storing for transmitting said parametric data and said microinstructions to said means for receiving and storing of a plurality of said programmable signal processor means;

c) linkage means coupled to said at least two of said plurality of programmable apparatus, for carrying signal data and timing signals between the same.

8. A programmable system according to claim 7, wherein: said core means of each said plurality of programmable apparatus further comprises test function means for testing at least one of said programmable signal processor means to determine whether said at least one of said programmable signal processor means is functioning properly.

9. A programmable system according to claim 7, wherein: each of said programmable apparatus further comprises a first non-volatile programmable memory means coupled to said communications bus for storing topological, parametric, and microinstruction data for said programmable apparatus.

10. A programmable system according to claim 7, wherein:

said plurality of programmable signal processors include means for providing control outputs indicative of the state of said the respective programmable signal processors; and said interface means of said core means constitutes an intelligent buffer means for receiving at least said parametric data and addresses associated with said parametric data, and for receiving said control outputs indicative of the states of the respective programmable signal processors, said intelligent buffer means forwarding said parametric data via said third bus means to appropriate means for receiving and storing parameters of said programmable signal processors when permitted by said control outputs.

11. A programmable system according to claim 10, wherein:

each of said core means further comprises a plurality of parallel register means for interfacing said communications bus with at least a plurality of said programmable signal processors, and for permitting signal data to be written directly to or read directly from said a programmable signal processor via said communications bus and an associated said parallel register means.

12. A programmable system according to claim 10, in conjunction with topology and parameter determination means for determining for each of said plurality of programmable apparatus, in conjunction with a computer, a suitable topology for each of said programmable apparatus, and suitable parameters and microcode for each said programmable signal processor means in response to input into said computer by a user of desired programmable system functioning, wherein said topology and parameter determination means is coupled to said communications bus, and said suitable topology and parameters are translated by said topology and parameter determination means into topological and parametric data, said parametric data being forwarded to said first programmable memory means of each said plurality of programmable apparatus via said communications bus, said intelligent buffer means of said core means of each respective programmable apparatus, and said at least one third bus of each respective programmable apparatus.

13. A programmable apparatus according to claim 3, further comprising:

f) topology and parameter determination means for determining in conjunction with a computer, a suitable topology for said programmable apparatus, and suitable parameters for said programmable signal processing means in response to input into said computer by a user of desired programmable system functioning, wherein said topology and parameter determination means is coupled to said communications bus, and said suitable topology and parameters are translated by said topology and parameter determination means into topological and parametric data, said parametric data being forwarded to said first programmable memory means via said communications bus, and said parametric data being forwarded to each of said means for receiving and storing parameters via said communications bus, said core means, and said at least one third bus.

14. A method for designing a custom programmable apparatus, said apparatus interfacing with a communications bus and having a plurality of programmable signal processor means which are programmed with parameters and microinstructions for controlling and performing operations on received signal data, a core means capable of interfacing with said communications bus, of distinguishing between at least topological, signal, and at least one of parametric and microinstruction data received by said core means over said communications bus, and of interconnecting at least two of said plurality of programmable signal processor means via a plurality of signal data bus means in a desired manner, and at least one third bus means for carrying parametric information and microinstruction information from said core means to said programmable signal processor means, said method comprising:

a) determining suitable interconnections of said plurality of said programmable signal processor means and said signal data bus means for accomplishing desired functions on data flowing therethrough;

b) determining suitable parameters and microinstructions for said programmable signal processor means;

c) arranging said core means by coding said determined suitable interconnections into first code and forwarding said first code via said communications bus to said core means to cause said core means to assume said determined suitable interconnections; and d) providing said determined suitable parameters and microinstructions for said programmable signal processor means to said programmable signal processor means by coding said suitable parameters into second code and forwarding said second code via said communications bus, said core means, and said at least one said third bus means to a desired programmable signal processor means.

15. A method according to claim 14, wherein:

said steps of determining suitable interconnections and suitable parameters and microinstructions comprise inputting into a processor controlling said communications bus indications of a desired transfer function for said apparatus, wherein said processor is programmed to obtain said desired transfer function and to synthesize therefrom said suitable interconnections and said suitable parameters and microinstructions.

16. A method for designing a custom apparatus having a plurality of functional block means having desired parameters for performing desired operations on received signal data, and means for interconnecting in a desired manner at least two of said plurality of functional block means, said method comprising:

a) obtaining a programmable apparatus which interfaces with a communications bus, said apparatus having a plurality of programmable signal processor means for performing operations on received signal data, a core means capable of interfacing with said communications bus and of interconnecting at least two of said plurality of programmable signal processor means in a desired manner, a plurality of signal data bus means for carrying said signal data, and at least one third bus means for obtaining and carrying parametric data and microinstruction data to said programmable signal processor means;

b) in conjunction with a processor coupled to at least said communications bus, determining suitable interconnections of said plurality of programmable signal processors of said programmable apparatus, and determining suitable parameters and microinstructions for said programmable signal processor means of said programmable apparatus;

c) arranging said core means of said programmable apparatus by coding said determined suitable interconnections into first code and forwarding said first code via said communications bus to said core means to cause said core means to assume said determined suitable interconnections;

d) providing said determined suitable parameters and suitable microinstructions to said programmable signal processor means of said programmable apparatus by coding said suitable parameters and microinstructions into second code and forwarding said second code via said at least one third bus to a desired programmable signal processor means of said programmable apparatus;

e) testing said programmable apparatus to determine whether said programmable apparatus is suitable for performing said desired operations;

f) finalizing core interconnection design, and finalizing said parameter values and microinstructions for said programmable signal processor means; and g) producing integrated circuits based on said finalized interconnection design and based on said parameter values and microinstructions, said integrated circuits having at least a plurality of functional block means functionally equivalent to those programmable signal processor means utilized in said finalizing step, said functional block means having said finalized parameter values.

17. A programmable apparatus comprising:

a) a communications bus for transmitting signal data, parameters, and microinstructions from a host;

b) at least one programmable signal processor means having means for receiving and storing said parameters and microinstructions, means for executing microinstructions, and control output means for outputting signals indicating the state of said programmable signal processor means, said programmable signal processor means for performing an operation according to said microinstructions and said parameters on said signal data received by said programmable signal processor means;

c) a core means comprising processing means for distinguishing between at least signal and parametric data received by said core means over said communications bus, intelligent buffer means for interfacing with said communications bus, for receiving said parametric data, for receiving said signals from said control output means, and for outputting said parametric data in response to said signals from said control output means;

d) at least one data bus means for coupling said communications bus to said programmable signal processor means via said core means and transmitting signal data thereover; and e) at least one third bus means coupling said intelligent buffer means to said means for receiving and storing parameters and microinstructions, for transmitting said parameters and microinstructions thereover.

18. A programmable apparatus according to claim 17, wherein said host constitutes a non-volatile programmable memory means.

19. A programmable apparatus for interfacing with a communications bus, said apparatus comprising:

a) a plurality of functional block means, each said functional block means for performing an operation on signal data received by said functional block means;

b) a core means comprising interface means for interfacing with said communications bus, processing means for distinguishing between at least topological and parametric data received by said core means over said communications bus, matrix switching means for interconnecting at least two of said plurality of functional block means in a desired manner in response to said topological data received over said communications bus, wherein parametric data received by said processing means is sent by said processing means via a parametric bus to at least a first of said functional block means to control internal parameters of a least said first of said functional block means, and wherein signal data is received by said plurality of functional block means via data busses coupled to said matrix switching means;

c) said plurality of data bus means; and d) said parametric bus.

20. A programmable apparatus according to claim 19, further comprising:

e) timing function means for receiving timing signals from a timing generator and for controlling the sequential flow of at least said signal data in response thereto.

21. A programmable apparatus according to claim 20, further comprising:

f) at least one non-volatile programmable memory means, for storing topological and parametric data for said programmable apparatus.

22. A programmable apparatus according to claim 20, wherein:

at least part of said timing function means is associated with each of said plurality of functional blocks, wherein each of said plurality of functional blocks further comprise buffer means for storing signal data, and flag means for indicating to said timing function means that the associated functional block has finished processing signal data.

23. A programmable apparatus according to claim 19, wherein:

said plurality of functional block means comprises an analog to digital converter, a digital to analog converter, a serial input port, a serial output port, a plurality of filters, and a bidirectional parallel port.

24. A programmable apparatus according to claim 19, wherein:

said processing means of said core means distinguishes between topological data, parametric data, and signal data.

25. A programmable apparatus according to claim 20, wherein:

said timing function means provides cycles having a computational time period terminating in a transfer time period for at least said signal data, said functional block means provides an output during said transfer time periods.

26. A programmable apparatus according to claim 19, wherein:

said switch matrix means is dynamic such that said switch matrix means is configured in a first configuration during a first time period for switching said serial flow of signal data and is configured in a second configuration during a second time period for switching said serial flow of signal data.

27. A programmable system according to the claim 21, further comprising:

g) topology and parameter determination means for determining, in conjunction with a computer, a suitable topology for said programmable apparatus and suitable parameters for said functional block means in response to input into said computer by a user of desired programmable apparatus functioning, wherein said topology and parameter determination means is coupled to said communications bus, and said suitable topology and parameters are translated by said topology and parameter determination means into topological and parametric data, said topological data being forwarded to said at least one first memory means via said communications bus for storage.

28. A programmable system, comprising:

a) a communications bus;

b) a plurality of programmable apparatus, each said programmable apparatus capable of interfacing with said communication bus, and each said programmable apparatus comprising, 1) a plurality of functional block means, each said functional block means for performing an operation on signal data received by said functional block means, 2) a core means comprising interface means for interfacing with said communications bus, processing means for distinguishing between at least topological and parametric data received by said core means over said communications bus, matrix switching means for interconnecting at least two of said plurality of functional block means in a desired manner in response to said topological data received over said communications bus, wherein parametric data received by said processing means is sent by said processing means via a parametric bus to at least a first of said functional block means to control internal parameters of a least said first of said functional block means and wherein signal data is received by said plurality of functional block means via data busses coupled to said matrix switching means, 3) said plurality of data bus means, and 4) said parametric bus; and c) linkage means for connecting at least two of said plurality of programmable apparatus.

29. A programmable system according to claim 28, wherein:

said core means further comprises timing function means for receiving timing signals from a timing generator and for controlling the sequential flow of at least said signal data in response thereto.

30. A programmable system according to claim 28, wherein:

said core means of each said plurality of programmable apparatus further comprises test function means for testing at least one of said functional block means to determine whether said at least one of said functional block means is functioning properly.

31. A programmable system according to claim 28, wherein:

each said programmable apparatus further comprises at least one non-volatile programmable memory means associated with said core means for storing topological and parametric data for said programmable apparatus.

32. A programmable system according to claim 28, wherein:

said linkage means carry at least said signal and timing data between said respective cores of said at least two of said plurality of programmable apparatus.

33. A programmable system according to claim 31, further comprising:

d) topology and parameter determination means for determining for each of said plurality of programmable apparatus, in conjunction with a computer, a suitable topology, and suitable parameters for said functional block means in response to input into said computer by a user of desired programmable system functioning, wherein said topology and parameter determination means is coupled to said communications bus, and said suitable topology and parameters are translated by said topology and parameter determination means into topological and parametric data and forwarded via said communications bus to said at least one programmable memory means for storage thereby.

34. A method for designing a custom programmable apparatus, said apparatus interfacing with a communications bus and having a plurality of functional block means having parameters for performing operations on received signal data, a core means for interfacing with said communications bus, for distinguishing between at least topological, signal, and parametric data received by said core means over said communications bus, and for signal flow interconnecting at least two of said plurality of functional block means in a desired manner, and a parametric bus means for carrying parametric information from said core means to said functional block means, said method comprising:

a) determining suitable signal flow interconnections of said plurality of functional blocks;

b) determining suitable parameters for said functional block means;

c) arranging said core means by coding said determined suitable signal flow interconnections into first code and forwarding said first code via said communications bus to said core means to cause said core means to assume said determined suitable interconnections; and d) providing said determined suitable parameters for said functional block means to said functional block means by coding said suitable parameters into second code and forwarding said second code via said communications bus, said core means and said parametric bus to a desired functional block means.

35. A method according to claim 34, wherein:

said steps of determining suitable signal flow interconnections and suitable parameters comprise inputting into a host processor controlling said communications bus indications of a desired transfer function for said apparatus, wherein said host processor is programmed to obtain said desired transfer function and to synthesize therefrom said suitable signal flow interconnections and said suitable parameters.

36. A method for designing a custom integrated circuit apparatus having a plurality of functional block means having desired parameters for performing desired operations on received signal data, and a core means interconnecting in a desired manner at least two of said plurality of functional block means for a desired sequential flow of signal data, said method comprising:

a) obtaining a programmable apparatus which interfaces with a communications bus, said apparatus having a plurality of functional block means for performing operations on received signal data, a core means for interfacing with said communications bus and for signal flow interconnecting at least two of said plurality of functional block means in a desired manner, and a parametric bus means for obtaining and carrying parametric data to said functional block means;

b) in conjunction with a host coupled to at least said communications bus and said programmable apparatus, determining suitable interconnections of said plurality of functional blocks of said programmable apparatus, and determining suitable parameters for said functional block means of said programmable apparatus;

c) arranging said core means of said programmable apparatus by coding said determined suitable interconnections into first code and forwarding said first code via said communications bus to said core means to cause said core means to assume said determined suitable interconnections;

d) providing said determined suitable parameters for said functional block means to said functional block means of said programmable apparatus by coding said suitable parameters into second code and forwarding said second code via said parametric bus to desired functional block means of said programmable apparatus;

e) testing said programmable apparatus to determine whether said programmable apparatus is suitable for performing said desired operations;

f) finalizing core interconnection design and parameter values for said functional block means; and g) producing integrated circuits based on said finalized interconnection design and based on said parameter values, said integrated circuit's having at least a plurality of interconnected functional block means having said finalized parameter values which are functionally equivalent to those functional block means utilized in said finalizing step.

* * * * *